US009519393B2

(12) United States Patent
Grossele et al.

(10) Patent No.: US 9,519,393 B2
(45) Date of Patent: Dec. 13, 2016

(54) MANAGEMENT SYSTEM USER INTERFACE FOR COMPARATIVE TREND VIEW

(75) Inventors: Hanspeter Grossele, Cham (CH);
Christof Lustenberger, Sempach (CH);
Thomas Rule, Arlington Heights, IL (US)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 13/538,242

(22) Filed: Jun. 29, 2012

(65) Prior Publication Data

US 2013/0086521 A1 Apr. 4, 2013

Related U.S. Application Data

(63) Continuation-in-part of application No. PCT/US2011/054141, filed on Sep. 30, 2011.

(60) Provisional application No. 61/541,925, filed on Sep. 30, 2011.

(51) Int. Cl.
| | |
|---|---|
| *G06F 3/048* | (2013.01) |
| *G05B 15/02* | (2006.01) |
| *G05B 23/02* | (2006.01) |
| *G06T 11/20* | (2006.01) |

(52) U.S. Cl.
CPC ............... *G06F 3/048* (2013.01); *G05B 15/02* (2013.01); *G05B 23/027* (2013.01); *G05B 23/0216* (2013.01); *G05B 23/0232* (2013.01); *G05B 23/0272* (2013.01); *G06T 11/206* (2013.01); *G05B 2219/2642* (2013.01)

(58) Field of Classification Search
USPC .................................. 715/806, 215; 705/404
See application file for complete search history.

(56) References Cited

U.S. PATENT DOCUMENTS

| | | | | |
|---|---|---|---|---|
| 5,226,118 | A | * | 7/1993 | Baker ................ G05B 23/0232 345/440 |
| 5,692,181 | A | * | 11/1997 | Anand et al. ................. 707/714 |
| 6,366,889 | B1 | * | 4/2002 | Zaloom ........................ 705/7.37 |
| 7,143,366 | B1 | * | 11/2006 | McKelvey et al. ........... 715/234 |
| 7,171,374 | B1 | * | 1/2007 | Sheehan et al. ............. 705/7.25 |
| 7,249,356 | B1 | * | 7/2007 | Wilson et al. ................ 718/101 |
| 8,132,101 | B2 | * | 3/2012 | Buck et al. ................... 715/708 |

(Continued)

FOREIGN PATENT DOCUMENTS

| | | |
|---|---|---|
| JP | 09-022277 A | 1/1997 |
| JP | 2000-268089 A | 9/2000 |
| JP | 2010-039829 A | 2/2010 |

OTHER PUBLICATIONS

"Sony Corporation (ADR)—Google Finance" 2010.*

(Continued)

*Primary Examiner* — Jennifer To
*Assistant Examiner* — Beau Spratt (57) ABSTRACT

Methods, mediums, and systems include use of a system manger application in a data processing system to manage a building automation system, to display a trend view chart on a graphical user interface, based on a trend view definition, showing the changing value of point data over time from a building automation system device, and to automatically display a comparative chart, based on the trend view definition, of historical point data from the building automation system device upon selection of a predefined comparative trend view button and an offset time period.

14 Claims, 5 Drawing Sheets

(56) References Cited

U.S. PATENT DOCUMENTS

| | | | |
|---|---|---|---|
| 2007/0109301 A1* | 5/2007 | Smith | 345/440 |
| 2008/0065510 A1* | 3/2008 | Yu | 705/27 |
| 2008/0270363 A1* | 10/2008 | Hunt et al. | 707/3 |
| 2009/0281677 A1* | 11/2009 | Botich et al. | 700/295 |
| 2010/0175019 A1* | 7/2010 | Sitton | G06F 3/0481 715/781 |
| 2011/0010662 A1* | 1/2011 | Zhang et al. | 715/806 |
| 2011/0029853 A1* | 2/2011 | Garrity et al. | 715/215 |
| 2011/0087985 A1* | 4/2011 | Buchanan et al. | 715/771 |
| 2011/0196217 A1* | 8/2011 | Myoujou et al. | 600/365 |
| 2012/0084455 A1* | 4/2012 | McCue | H04N 21/235 709/231 |
| 2013/0067379 A1* | 3/2013 | Chutkay et al. | 715/771 |

OTHER PUBLICATIONS

PCT Search Report mailed Mar. 8, 2013, for PCT Application No. PCT/US2012/057233.
Korean Office Action dated Jul. 16, 2015, for Application No. 10-2014-7011893, 6 pages.

\* cited by examiner

MANAGEMENT SYSTEM USER INTERFACE FOR COMPARATIVE TREND VIEW

CROSS-REFERENCE TO OTHER APPLICATIONS

This application claims priority to PCT Application Serial No. PCT/US2011/054141, filed Sep. 30, 2011, entitled "Management System with Versatile Display" and to U.S. Provisional Patent Application Ser. No. 61/541,925, filed Sep. 30, 2011, entitled "Management System Using Function Abstraction for Output Generation", both of which are hereby incorporated by reference. This application also shares some subject matter in common with, but is otherwise unrelated to, the following patent applications, filed concurrently herewith, all of which are incorporated by reference:

U.S. patent application Ser. No. 13/537,975, published as US 20130083035, for "Graphical Symbol Animation with Evaluations for Building Automation Graphics";

U.S. patent application Ser. No. 13/538,275, published as US 20130083012, for "Navigation and Filtering with Layers and Depths for Building Automation Graphics";

U.S. patent application Ser. No. 13/538,073, published as US 20130082832, for "Unified Display of Alarm Configurations Based On Event Enrollment Objects";

U.S. patent application Ser. No. 13/537,911, published as US 20130086066, for "Automated Discovery and Generation of Hierarchies for Building Automation and Control Network Objects"; and U.S. patent application Ser. No. 13/538,182, published as US 20130086152, for "Management System User Interface in a Building Automation System".

TECHNICAL FIELD

The present disclosure is directed, in general, to automation systems and, more particularly, to graphical user interfaces for a management system in a building automation system capable of automatically creating and displaying a comparative trend view for use in analyzing measured data from devices within the building automation system.

BACKGROUND OF THE DISCLOSURE

Building automation systems encompass a wide variety of systems that aid in the monitoring and control of building operations. Building automation systems include security systems, fire safety systems, and comfort systems that control environmental parameters such as heating, ventilation, and air conditioning ("HVAC") and lighting. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operations may be controlled.

To allow for monitoring and control of the dispersed control system elements, building automation systems often employ multi-level communication networks to communicate operational and/or alarm information between operating elements, such as sensors and actuators, and the centralized control station. Several control stations connected via an Ethernet or another type of network may be distributed throughout one or more building locations, each having the ability to monitor and control system operations.

An important function of a management system for building automation devices involves providing a way for users to quickly and easily view building status information and manage the appropriate devices and systems. Improved systems and methods are desirable.

SUMMARY OF THE DISCLOSURE

Various disclosed embodiments include methods, mediums, and systems to use a system manager application in a data processing system to manage a building automation system, to display a first trend view chart on a graphical user interface, based on a trend view definition, showing the changing value of point data over a time range from a building automation system device, and to automatically display a second trend view chart, based on the first trend view chart and its trend view definition, but offset by a time period upon selection of a predefined comparative trend view button and selection of the offset time period.

Various embodiments include a method for creating a comparative trend view in a graphical user interface of a building management system. The method includes maintaining a system manager application in a data processing system of a management system configured to perform building management system functions and to provide a graphical user interface. The method includes running the system manager application to perform various processes. The system manager application can display a trend view chart on the graphical user interface using a trend view definition selected by a user. The system manager application can acquire trend data associated with the trend view definition from a trend database in the data processing system. The system manager application can populate the trend view chart with the trend data values associated with the trend view definition. The system manager application can display a predefined comparative trend view button on the graphical user interface. The system manager application can display a comparative trend view chart on the graphical user interface based on the trend view definition upon selection of the predefined comparative trend view button by the user. The system manager application can acquire trend data values from the trend database in the data processing system based on an offset time period selected by the user. The system manager application can populate the comparative trend view chart with the trend data values associated with the offset time period.

Various embodiments include a method for creating a comparative trend view in a graphical user interface of a building management system comprising the steps of maintaining a system manager application in a data processing system of a management system configured to perform building management system functions and to provide a graphical user interface. The method includes running the system manager application to perform various processes. The system manager application can display a comparative trend view chart on the graphical user interface, based on a trend view definition, in response to a user selection. The system manager application can acquire historical trend data values from the data processing system based on a selected offset time period. The system manager application can populate the comparative trend view chart with the historical trend data values associated with the offset time period and with current data values received from at least one building automation system device.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conceptions and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

An important function of a management system for building automation devices involves the acquisition, storage and display of current and historical data (i.e., trends) for analysis of workflows and processes within a building, plant or other facility. All available process data of a management system can be recorded and applied to optimize the operation of building automation system devices. Changes in measured data of building automation system devices over time is recorded and displayed in a trend view in a graphical user interface of the management system for evaluation. A trend view is a chart area of a display screen where trend data is graphically displayed over a selected time range. The trend view may display data that is currently being generated and stored in a trend database or data that was generated in the past and stored. The trend view could include, for example, the display of a trend curve of room temperature measurements over a period of time in relation to an entered setpoint temperature. A trend view is defined by a user in order to graphically display recorded changes in measured point data over time. The trend view definition involves defining what point data is to be graphically displayed as well as the chart properties required for the desired graphical display. This includes selecting the trend view title, gridlines, scaling, and background associated with the measured data point being analyzed. The trend view definition may include selecting a time range for the X-axis and the position and scales of the Y-axis of the chart. The time range of the displayed data, for example, could be one hour or one month. The trend view definition may also include defining line properties including line thickness and color. A data processing system can save trend views independently of the trend data. Once the trend view is displayed, the time range of the displayed data can be modified by changing the date and time when the time range of the data begins and ends. For example, a trend view chart having an X-axis with an initial time range of one day may be modified by use of a time range scrollbar to select a time range of one month or one year. The start and end dates and times for the time range may also be entered directly.

Various disclosed embodiments include systems, methods and mediums to automatically generate and display a comparative trend view on a graphical user interface of a management system after a first trend view has been generated and displayed. The second or comparative trend view is automatically generated and displayed when a user selects a predefined comparative trend view button on the graphical user interface. The first trend view in a display serves as the basis for the comparative trend view which can be positioned immediately above the trend view for ease of data analysis. This novel method is useful for quickly and conveniently analyzing management system data because it provides a means to automatically generate a graphical comparison between how a particular measured value changed during a particular time period (i.e., how the value is trending) with how the value trended at a time offset from the time displayed in the first trend view chart. The comparative trend view may display point data in a second trend view for a time range offset in time either before or after the time range displayed in the first trend view.

Figure 1:
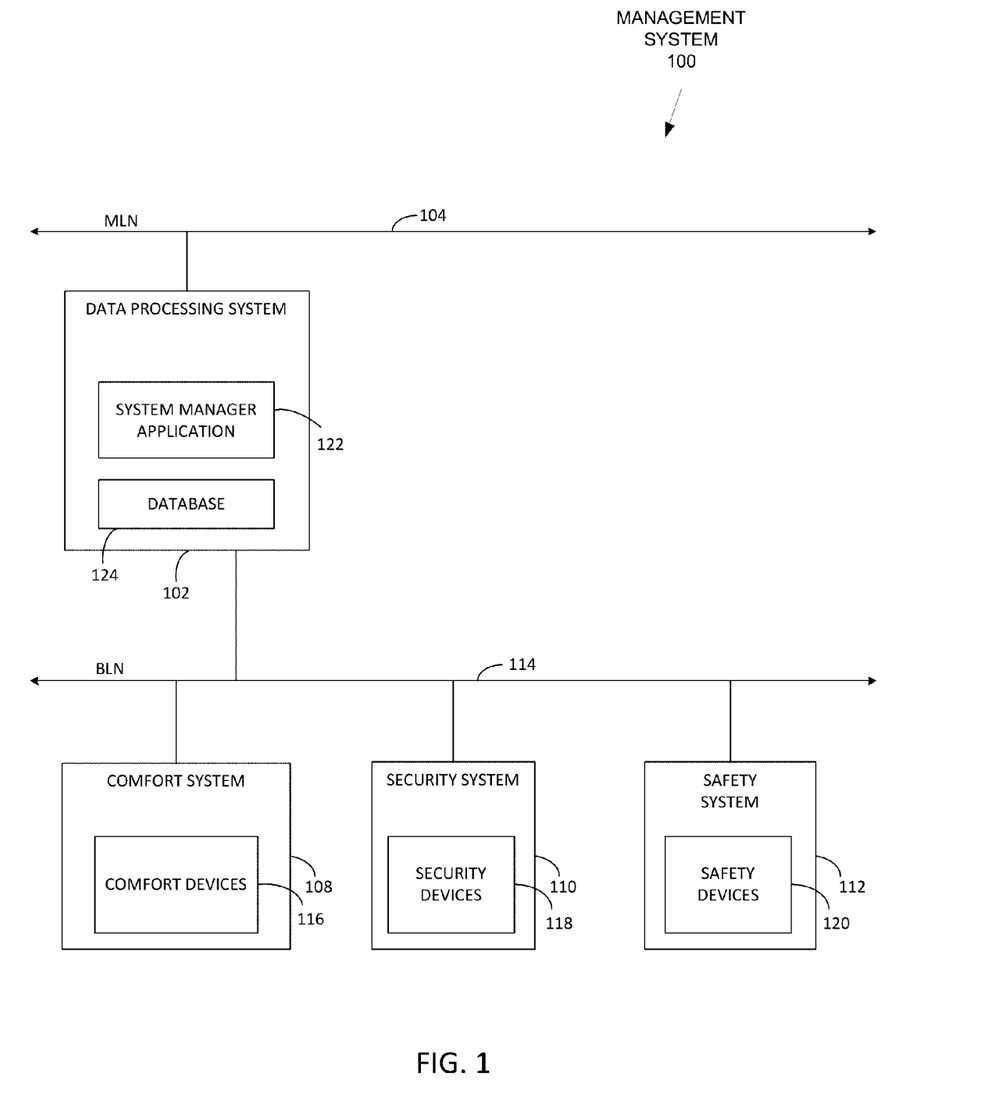
FIG. 1 illustrates a block diagram of a management system in accordance with disclosed embodiments.

FIG. 1 illustrates a block diagram of management system 100 in which various embodiments of the present disclosure are implemented. In this illustrative embodiment, the management system 100 includes a data processing system 102 connected, via a management level network (MLN) 104 to various other data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, data processing system 102 is operably connected to comfort system 108, security system 110, and safety system 112 via building level network (BLN) 114. The comfort system 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the comfort system 108 includes comfort devices 116, the security system 110 includes security devices 118, and the safety system 112 includes safety devices 120. The devices 116-120 may be located inside or in proximity to one or more buildings under the control of the management system 100. The devices 116-120 are configured to provide, monitor, and/or control functions of the comfort system 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a building.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on a data processing system 102. In some embodiments, system manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation". The system manager application 122 is a collection of software and associated data files. The system manager application 122 may include, for example, without limitation, executable files, user layout definition files, rules files, graphics control modules, an infrastructure interface, and/or a number of software extensions. The system manager application 122 provides a user-modifiable and intuitive graphical user interface for allowing a user to monitor, review, and control various building automation system devices. The system manager application 122 provides a user-modifiable and intuitive graphical user interface for allowing a user to define and display a first trend view and to also automatically generate and display a second or comparative trend view on the same screen based upon the displayed first trend view upon selection, by a user, of a predefined comparative trend view button. The data displayed in the second trend view may then be determined by selecting an offset time period. Any change to the time range of the first trend view may be automatically reflected in the second or comparative trend view. In some embodiments, the second trend view can overlay the first trend view in a common chart, rather than the second trend view being displayed proximate to the first trend view.

The data processing system 102 includes a database 124 that stores information about the devices 116-120 within the management system 100. A database 124 includes one or more data models of data points, devices, and other objects monitored and controlled by the management system 100. For example, the database 124 may store values for devices in the comfort system 108 (e.g., temperature, alarm status, humidity). These values may each be referred to as a point or data point. The database 124 may also store static information, such as, model numbers, device types, and/or building and room installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects associated with the management system 100 include anything that creates, processes, or stores information regarding data points, such as physical devices (controllers, field panels, sensors, actuators, cameras, etc.) and maintains data files, such as control schedules, trend reports, defined system hierarchies, and the like.

The system manager application 122 may further include software extensions or services that provide operations of the management system 100. For example, the software extensions may include a print manager, a reporting subsystem, and a status propagation manager. For example, a reporting subsystem implemented on a workstation data processing system 102 is a system that manages the acquisition of data values from the database 124 used in the generation of reports as well as comparative trend views.

The data processing system 102 is connected to the BLN 114 and includes one or more hardware and/or software interfaces for sending and receiving information to and from the devices 116-120 in the comfort system 108, the security system 110, and/or the safety system 112. For example, the data processing system 102 may request and receive data regarding a status of one or more devices in the devices 116-120. The system manager application 122, via data processing system 102, also provides a user with the functionality to monitor real-time information about the status of one or more devices and objects associated with the management system 100. The client manager application 122, via server data processing system 102 or client data processing system 106, also provides a user with the functionality to issue commands to control one or more devices and objects associated with the management system 100. For example, one or more of the devices 116-120 may operate on a network protocol for exchanging information with the management system, such as BACnet or LonTalk.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, the building automation systems controlled by the management system 100 may not include one or more of the comfort system 108, the security system 110, and/or the safety system 112.

Figure 2:
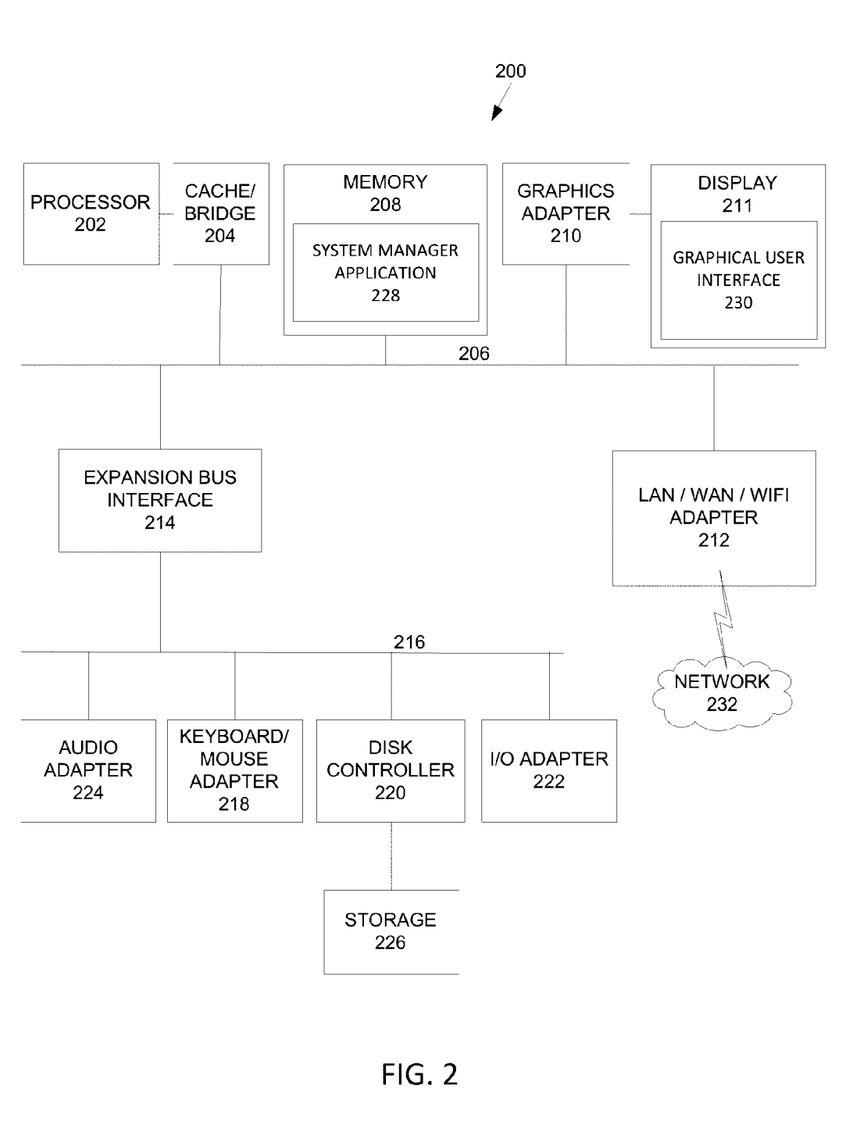
FIG. 2 illustrates a block diagram of a data processing system that may be employed in the management system in FIG. 1 in accordance with disclosed embodiments.

FIG. 2 depicts a block diagram of a data processing system 200 in which various embodiments are implemented. The data processing system 200 is an example of one implementation of the server data processing system 102 in FIG. 1.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EE-PROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as a workstation with all or portions of a system manager application 122 installed in the memory 208 as a system manager application 228.

The system manager application 228 is an example of one embodiment of system manager application 122 in FIG. 1. For example, the processor 202 executes program code of the system manager application 228 to generate graphical interface 230 displayed on display 211. In various embodiments of the present disclosure, the graphical user interface 230 provides an interface for a user to view information about and control one or more devices, objects, and/or points associated with the management system 100. The graphical user interface 230 also provides an interface that is customizable to present the information and the controls in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/Wifi adapter 212 may be connected to a network 232, such as, for example, MLN 104 in FIG. 1. As further explained below, the network 232 may be any public or private data processing system network or combination of networks known to those of skill in the art, including the Internet. Data processing system 200 may communicate over network 232 to one or more computers, which are also not part of the data processing system 200, but may be implemented, for example, as a separate data processing system 200.

In various embodiments, system manager application 122 may, via data processing system 102, generate reports of both current trends of values as well as historical trends of values generated within the devices monitored by the management system 100 and display graphical representations of such trends of values on a graphical user interface 230. In addition, in various embodiments, system manager application 122 may, via data processing system 102, automatically generate two trend views in the same display for ease of comparing a first trend view chart with a second trend view chart in which the data is offset by a selected period of time. For example, a lower first trend view chart in a display may serve as the basis for an upper second or comparative trend view chart. After the first trend view is defined and trend data is displayed for a particular time period, a second or comparison trend view is automatically generated and displayed above the trend view upon selection of a predefined comparative trend view button. The data displayed in the comparative trend view may be determined by selection of a desired time offset either before or after the time range of the first trend view.

Of course, in various embodiments, comparative trend view can be displayed in other locations relative to the first trend view, such as above the first trend view, below the first trend view, to the side of the first trend view, on the same or a different display as the first trend view, or overlaying the first trend view, all of which can be considered "proximate to" the first trend view.

Figure 3:
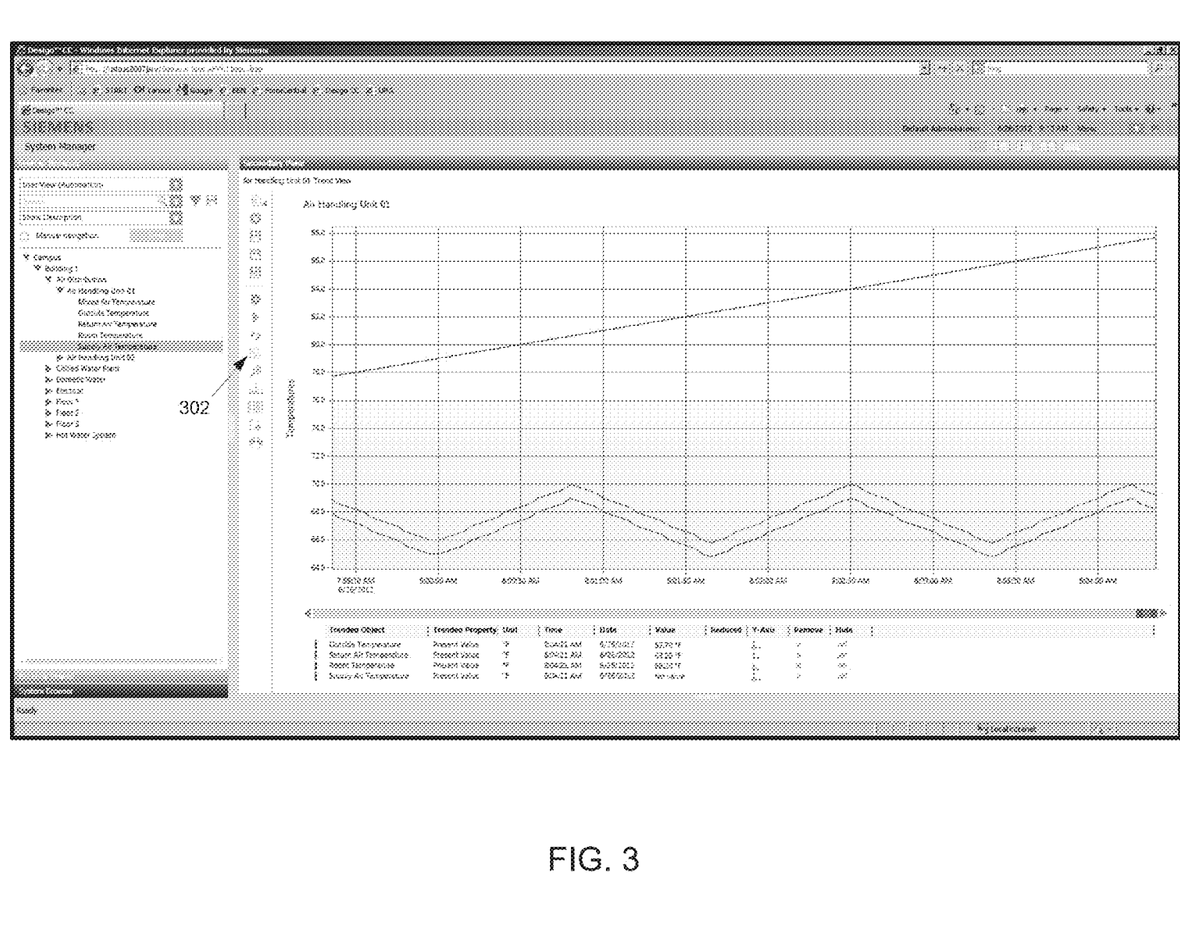
FIG. 3 shows a screen capture of an exemplary screen display of a first trend view generated by the data processing system in FIG. 2 in accordance with disclosed embodiments.

Referring to FIG. 3, there is shown a screen capture of an exemplary screen display generated by the data processing system 200 of a first trend view on graphical user interface 230 in FIG. 2 populated by point data that changes over the time range shown on the X-axis of the chart.

Figure 4:
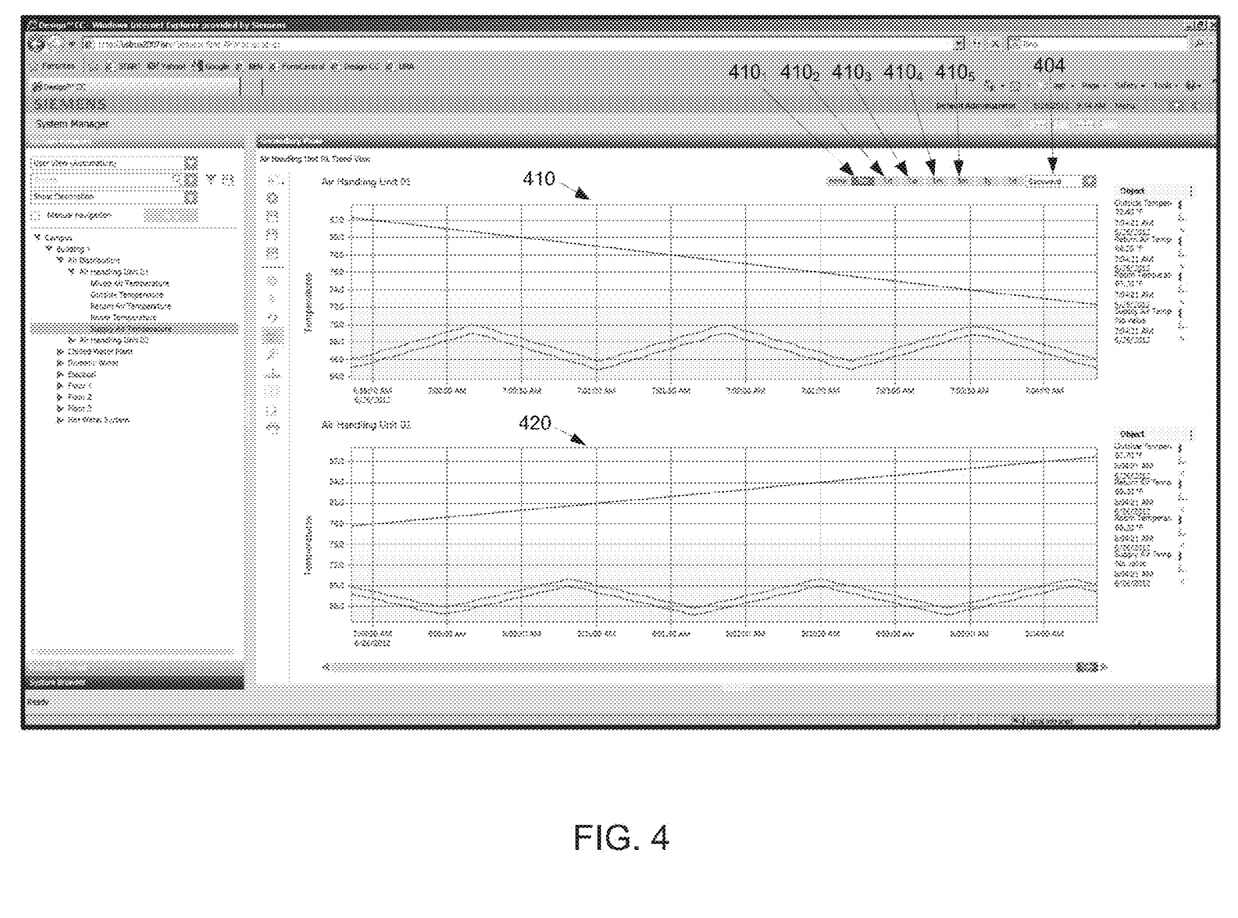
FIG. 4 shows a screen capture of an exemplary screen display of a comparative trend view generated by the data processing system in FIG. 2, showing both the first trend view chart of FIG. 3 and a second comparative trend chart offset in time to the first trend view chart, in accordance with disclosed embodiments.

Referring to FIG. 4, there is shown a screen capture of an exemplary screen display generated by the data processing system 200 of a comparative trend view 410 in which the first trend view of FIG. 3 is again displayed and a second or comparative trend view 410 is displayed immediately above the first trend view 420 upon selection of a predefined comparative trend view button 302 on the graphical user interface 230. In particular, second trend view 410 is displayed by the data processing system 200 above the first trend view 420 so that the time interval bars on the X-axis of the second trend view are aligned with the time interval bars on the X-axis of the first trend view for ease of exact or offset time comparison between the two views. The data in the comparative trend view 410 shown in FIG. 4 is automatically determined upon selection of a desired offset time for ease in comparing and analyzing the relevant trend data.

The comparative trend view 410 allows a user to compare measured values appearing in a first trend view 420 with trend data offset in time. When a trend view has been defined and displayed on a graphical user interface and a predefined comparative trend view button 302 is selected by a user, the same trend view is automatically displayed in a second or comparative view, preferably immediately above the first trend view. The defined properties of the trend view chart 420 serves as the basis for creating the comparative trend view chart 410. The comparative trend view chart is displayed and, upon selection of a time period, offset either before or after the time displayed in the trend view, populated with the comparative point data values.

Referring to FIG. 4, predefined buttons 410(1), 410(2), 410(3), 410(4), and 410(5), allow the user to offset the data displayed in the comparative trend view 410 to the data displayed in the trend view 420 by a selected time offset either backward or forward in time. The predefined buttons allow the user to select a time offset, for example, by one hour, one day, one week, one month or one year. The user could also manually enter any amount of time by which to offset the comparative view in drop down box 404. The comparative trend view 410 may be generated by running the system manager application 122 to retrieve the requested trend data from a trend database in a data processing system 102 within the management system 100. The automatic generation and display of a comparative trend view 410 is ideal for extended data analysis with time offset. Any changes by a user to the time range of the X-axis in the first trend view 420 is automatically reflected in the comparative trend view 410. For example, a duration selection bar appears below the trend view 420. This allows the user to define the duration displayed in the trend view 420 by selecting a start date and time and an end date and time for the data to be displayed. Any change in the duration of the trend view 420 through use of the duration selection bar or by manual entry of the desired duration is automatically reflected in the comparative trend view 410.

Figure 5:
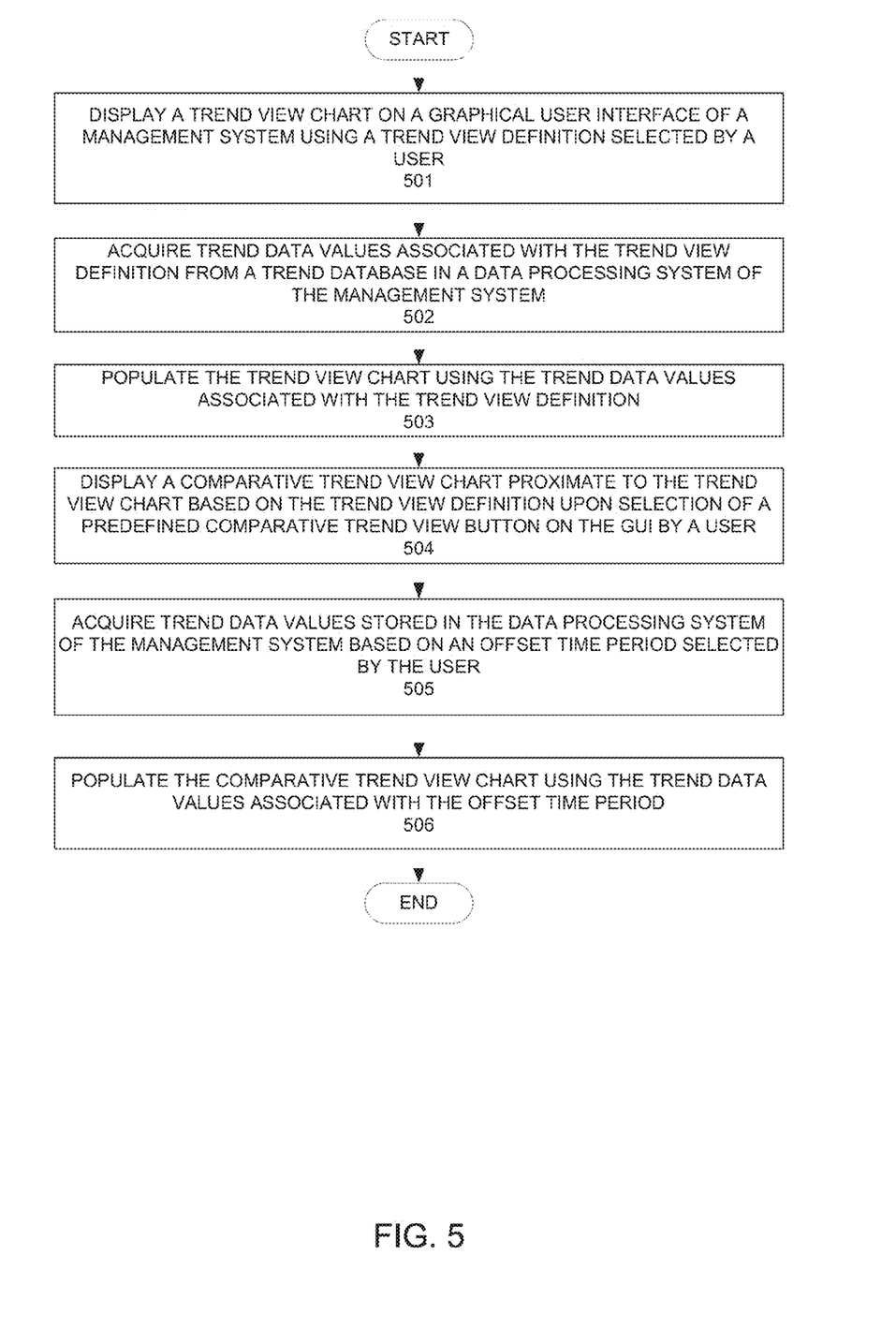
FIG. 5 illustrates depicts a flowchart of a process performed in the management system in accordance with disclosed embodiments.

FIG. 5 depicts a flowchart of an exemplary set of operations that may be executed by a management system to automatically generate and display a comparative trend view upon selection of a predefined comparative trend view button on a graphical user interface and selection of an offset time period. The process may be implemented by executable instructions stored in a non-transitory computer-readable medium that cause one or more data processing systems to perform such a process. For example, the system manager application 122 may comprise the executable instructions to cause one or more data processing systems to perform such a process.

The process begins with display of a first trend view in a chart area on the graphical user interface of a management system using a trend view definition selected by a user (step 501). The trend view is a chart that is formatted to display selected trend data relating to the workflow or processes within a facility. It can be used to display the current or historical data from operation of a building automation system device such as one associated with a comfort system, security system, or a safety system. The trend view graphically displays changes in data values over a selected time period. A user selects the trend view definition to determine the format of the chart and the information to be displayed. The trend view definition may define the chart properties including a title, gridlines, line thickness, and background color. The trend view definition may determine the time range of the chart's X-axis under consideration. It may determine whether the Y-axis is located on the left or right side of the chart as well as the scale to be used in displaying changes in the relevant data values over time. The system manager application may be run to display the first trend chart on the graphical user interface. Once the trend view is displayed, the system manager application may be run to change the time range of the X-axis of the first trend chart.

Trend data generated by a building automation system device associated with the trend definition may be stored in a trend database of the data processing system (step 502). The system manager application may be run to acquire trend data such as, for example, environmental parameters within a building for analysis including temperature data, humidity data, air flow data, and lighting data. The trend data may include other changes in measured value over time such as motion detection data, security alarm data, smoke detection data, and power use data. The system manager application in cooperation with one or more data processing systems may request and receive information regarding the status of the device or object under consideration from the trend database.

The first trend view chart is populated using the trend data obtained from the trend database (step 503). The system manager application may be run to display the trend data collected in step 502 on the trend chart defined in step 501.

Upon selection of a predefined comparative trend button on the graphical user interface, a second or comparative trend view chart is displayed proximate to the first trend view chart based on the first trend view definition (step 504). The system manager application, for example, may be run to display a predefined comparative trend view button on the graphical user interface. When the predefined comparative trend view button is selected by a user, the system manager application displays a comparative trend chart in an area of the graphical user interface proximate to the first trend view, such as immediately above the first trend view, using the same properties used to create the first trend view chart. For example the upper comparative trend view chart may have the same X-axis time range that appears in the lower trend view chart as well as the same Y-axis properties. The views are preferably aligned for ease in analyzing the trend data on the different charts.

Trend data values stored in a trend database in the data processing system of the management system is acquired for the comparative trend view chart based on an offset time period selected by a user (step 505). For example, the data processing system may include a trend database that stores measured values related to the devices in the comfort system such as historical temperature, alarm status, or humidity values. The system manager application may include a reporting system that manages the acquisition of data from the trend database as well as other databases for use in creating a comparative trend view. The offset time period may be selected by a user by, for example, clicking on one of several predefined time offset button on the graphical user interface or by using an area on the graphical user interface in which a time offset can be entered.

The comparative trend view chart is populated using the designated trend data values showing changes in the point data over a time range (step 506). The system manager application, for example, may be run to display the data acquired in step 505 on the comparative trend view chart displayed in step 504.

Those skilled in the art will recognize that, for simplicity and clarity, the full structure and operation of all data processing systems suitable for use with the present disclosure are not being depicted or described herein. Instead, only so much of a management system as is unique to the present disclosure or necessary for an understanding of the present disclosure is depicted and described. The remainder of the construction and operation of management system 100 may conform to any of the various current implementations and practices known in the art.

Moreover, none of the various features or processes described herein should be considered essential to any or all embodiments, except as described below. Various features may be omitted or duplicated in various embodiments. Various processes described above may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for creating a comparative trend view in a graphical user interface of a building management system comprising the steps of:
    maintaining a system manager application in a data processing system of a management system configured to perform building management system functions and to provide a graphical user interface;
    running the system manager application;
    displaying a trend view chart on the graphical user interface using a trend view definition selected by a user;
    acquiring trend data associated with the trend view definition from a trend database in the data processing system, the trend data values comprising measured values from a building automation system device acquired over a first time period;
    populating the trend view chart with the trend data values associated with the trend view definition;
    displaying a predefined comparative trend view button on the graphical user interface;
    displaying a comparative trend view chart on the graphical user interface next to the trend view chart based on the trend view definition of the trend view chart upon selection of the predefined comparative trend view button by the user;
    displaying one or more predefined time offset buttons on the graphical user interface, wherein selection of one of the one or more predefined offset buttons creates an offset time period of the comparative trend view chart from the trend view chart based on a time interval specified by the one or more predefined offset buttons, and wherein the predefined offset buttons include an option to change the offset time period between forward in time and backwards in time;
    acquiring historical trend data values from the trend database in the data processing system based on the offset time period selected by the user, the historical trend data values comprising measured values from the same building automation system device acquired over a second time period that is offset from the first time period by the offset time period; and
    populating the comparative trend view chart with the historical trend data values; and
    in response to receiving a change in a time range represented by the trend view chart, automatically updating the comparative trend view chart according to the change in the time range and the offset time period.

2. The method of claim 1 further comprising the step of displaying an area on the graphical user interface for entry of a time offset.

3. The method of claim 1, wherein the comparative trend view chart is displayed immediately above the trend view chart.

4. The method of claim 1, wherein the predefined offset buttons are offset by one day, offset by one week, offset by one month, and offset by one year.

5. The method of claim 1, wherein the offset time period is manually entered by the user.

6. The method of claim 1, wherein the comparative trend view chart is a time offset of the trend view chart.

7. A non-transitory computer-readable medium encoded with executable instructions that is configured to run in a data processing system of a management system, configured to perform building management system functions, and configured to provide a graphical user interface capable of:

displaying a trend view chart on the graphical user interface using a trend view definition selected by a user;

acquiring trend data values associated with the trend view definition from a trend database in the data processing system, the trend data values comprising measured values from a building automation system device acquired over a first time period;

populating the trend view chart with the trend data values associated with the trend view definition;

displaying a predefined comparative trend view button on the graphical user interface;

displaying a comparative trend view chart on the graphical user interface next to the trend view chart based on the trend view definition of the trend view chart upon selection of the predefined comparative trend view button by the user;

displaying one or more predefined time offset buttons on the graphical user interface, wherein selection of one of the one or more predefined offset buttons creates an offset time period of the comparative trend view chart from the trend view chart based on a time interval specified by the one or more predefined offset buttons, and wherein the predefined offset buttons include an option to change the offset time period between forward in time and backwards in time;

acquiring historical trend data values from the trend database in the data processing system based on the offset time period selected by the user, the historical trend data values comprising measured values from the same building automation system device acquired over a second time period that is offset from the first time period by the offset time period; and populating the comparative trend view chart with the historical trend data values.

8. A method for creating a comparative trend view in a graphical user interface of a building management system comprising the steps of:

maintaining a system manager application in a data processing system of a management system configured to perform building management system functions and to provide a graphical user interface;

running the system manager application;

displaying a comparative trend view chart and a trend view chart next to the comparative trend view chart on the graphical user interface, both based on a trend view definition, in response to a user selection;

displaying one or more predefined time offset buttons on the graphical user interface, wherein selection of one of the one or more predefined offset buttons creates a selected offset time period of the comparative trend view chart from the trend view chart based on a time interval specified by the one or more predefined offset buttons, and wherein the predefined offset buttons include an option to change the offset time period between forward in time and backwards in time;

acquiring historical trend data values from the data processing system comprising measured values of at least one building automation system device based on the selected offset time period; and populating the comparative trend view chart with the historical trend data values associated with the offset time period and with current data values received from the at least one building automation system device, wherein the current data values are displayed in the trend view chart.

9. A data processing system, comprising:

a storage device comprising a system manager application;

an accessible memory comprising instructions of the system manager application;

a processor configured to execute the instructions of the system manager application to:

perform building management system functions and to provide a graphical user interface;

display a trend view chart on the graphical user interface using a trend view definition selected by a user;

acquire trend data values associated with the trend view definition from a trend database in the data processing system, the trend data values comprising measured values from a building automation system device acquired over a first time period;

populate the trend view chart with the trend data values associated with the trend view definition;

display a predefined comparative trend view button on the graphical user interface;

display a comparative trend view chart on the graphical user interface next to the trend view chart based on the trend view definition of the trend view chart upon selection of the predefined comparative trend view button by the user;

display one or more predefined time offset buttons on the graphical user interface, wherein selection of one of the one or more predefined offset buttons creates an offset time period of the comparative trend view chart from the trend view chart based on a time interval specified by the one or more predefined offset buttons, and wherein the predefined offset buttons include an option to change the offset time period between forward in time and backwards in time;

acquire historical trend data values from the trend database in the data processing system based on the offset time period selected by the user, the historical trend data values comprising measured values from the same building automation system device acquired over a second time period that is offset from the first time period by the offset time period; and populate the comparative trend view chart with the trend data values from the sensor for the building automation system device associated with the offset time period.

10. The data processing system of claim 9 wherein an area for entry of a time offset is provided on the graphical user interface.

11. The data processing system of claim 9, wherein the comparative trend view chart is displayed immediately above the trend view chart.

12. A data processing system, comprising:

a storage device comprising a system manager application;

an accessible memory comprising instructions of the system manager application;

a processor configured to execute the instructions of the system manager application to:

perform building management system functions and to provide a graphical user interface;

display a comparative trend view chart on the graphical user interface populated with trend data values from a trend view chart based on a trend view definition of the trend view chart, in response to a user selection, the comparative trend view chart corresponding to measurements taken from a building automation system device acquired over a first time period;

display one or more predefined time offset buttons on the graphical user interface, wherein selection of one of the one or more predefined offset buttons creates a selected offset time period of the comparative trend view chart from the trend view chart based on a time interval specified by the one or more predefined offset buttons, and wherein the predefined offset buttons include an option to change the offset time period between forward in time and backwards in time;

acquire historical trend data values from the data processing system based on the selected offset time period, the historical trend data values comprising measured values from a same building automation system device acquired over a second time period that is offset from a first time period by the offset time period; and populate the comparative trend view chart with the acquired historical trend data values.

13. The data processing system of claim 12 wherein an area for entry of a time offset is provided on the graphical user interface.

14. The data processing system of claim 12, wherein the comparative trend view chart is displayed immediately above a trend view chart.

* * * * *